(12) United States Patent
Stegeman

(10) Patent No.: US 9,108,371 B2
(45) Date of Patent: Aug. 18, 2015

(54) INJECTION MOULD FOR FLEXIBLE TUBE

(75) Inventor: Gerrit Jan Stegeman, Lochem (NL)

(73) Assignee: Plasticum Netherlands B.V., Tilburg (NL)

( * ) Notice: Subject to any disclaimer, the term of this patent is extended or adjusted under 35 U.S.C. 154(b) by 132 days.

(21) Appl. No.: 13/819,953

(22) PCT Filed: Oct. 6, 2010

(86) PCT No.: PCT/NL2010/050659
§ 371 (c)(1),
(2), (4) Date: Apr. 29, 2013

(87) PCT Pub. No.: WO2012/030209
PCT Pub. Date: Mar. 8, 2012

(65) Prior Publication Data
US 2014/0057013 A1    Feb. 27, 2014

(30) Foreign Application Priority Data
Sep. 3, 2010 (NL) ........................... 2005313

(51) Int. Cl.
*B29C 45/14* (2006.01)
*B29D 23/20* (2006.01)
(Continued)

(52) U.S. Cl.
CPC ............ *B29D 23/20* (2013.01); *B29C 33/0061* (2013.01); *B29C 45/14467* (2013.01);
(Continued)

(58) Field of Classification Search
CPC ................. B29C 2045/167; B29C 2045/1673; B29C 45/16; B29C 45/1642; B29C 45/1615; B29C 45/1676; B29D 23/20
USPC ....................................................... 264/255
See application file for complete search history.

(56) References Cited

U.S. PATENT DOCUMENTS 4,959,005 A * 9/1990 Sorensen ................... 425/577
5,262,112 A * 11/1993 Sorensen ................... 264/255
(Continued)

FOREIGN PATENT DOCUMENTS

CN     1225063 A     8/1999
DE     102007018358 A1    10/2008
(Continued)

OTHER PUBLICATIONS

Search Report for Dutch Application No. 2005313 dated Jun. 9, 2011, 10 pages.
(Continued)

*Primary Examiner* — Jill Heitbrink
(74) *Attorney, Agent, or Firm* — Edell, Shapiro & Finnan, LLC

(57) ABSTRACT

An injection molding device for injection molding a flexible sleeve body for a squeezable tube, comprises a male mold part and a female mold part, which in combination with the male mold part forms a sleeve body cavity for forming the flexible sleeve body between them. The sleeve body cavity extends from a top end to an opposite bottom end in a longitudinal direction. The molding device further comprises a runner end part, which in combination with the female mold part and the male mold part forms a runner cavity at the top end of the sleeve body cavity. The runner cavity comprises a passage constituted by one or more openings connecting the annular shaped distribution channel with the sleeve body cavity for guiding the molten plastics material from a runner distribution channel into the sleeve body cavity. The one or more openings is/are evenly distributed along the perimeter of the sleeve body cavity and is/are narrow compared to the distribution channel upstream of the passage, such that the passage initially prevents the flow of molten plastics material from entering the sleeve body cavity, which results in a pressure build up in the runner cavity which eventually results in a pressure high enough to force the flow of molten plastics material through the passage into the sleeve body cavity.

18 Claims, 7 Drawing Sheets

(51) Int. Cl.
  B29C 45/27 (2006.01)
  B65D 35/08 (2006.01)
  B65D 35/22 (2006.01)
  B29C 33/00 (2006.01)
  B29C 45/00 (2006.01)
  B29C 45/16 (2006.01)
  B29L 23/20 (2006.01)

(52) U.S. Cl.
  CPC ............ B29C45/2708 (2013.01); B65D 35/08 (2013.01); B65D 35/22 (2013.01); B29C 45/0025 (2013.01); B29C 45/0046 (2013.01); B29C 45/14688 (2013.01); B29C 45/14836 (2013.01); B29C 45/16 (2013.01); B29C 45/1642 (2013.01); B29C 45/1676 (2013.01); B29C 2045/0051 (2013.01); B29C 2045/14918 (2013.01); B29C 2045/167 (2013.01); B29C 2045/2714 (2013.01); B29L 2023/20 (2013.01)

(56) References Cited

U.S. PATENT DOCUMENTS

| | | | |
|---|---|---|---|
| 5,927,566 A | 7/1999 | Mueller | |
| 7,077,989 B2* | 7/2006 | Brown et al. | 264/163 |
| 7,192,548 B2* | 3/2007 | Dambricourt | 264/335 |
| 2006/0188676 A1 | 8/2006 | Dambricourt | |
| 2007/0190275 A1 | 8/2007 | Helmenstein | |
| 2009/0004324 A1 | 1/2009 | Viel et al. | |
| 2009/0026221 A1 | 1/2009 | Fernandez De Mendiola Quintana | |

FOREIGN PATENT DOCUMENTS

| | | |
|---|---|---|
| EP | 1048582 A1 | 11/2000 |
| JP | 5162174 A | 6/1993 |
| JP | 2000-511481 A | 9/2000 |
| JP | 2003-526542 A | 9/2003 |
| WO | 97/46362 A1 | 12/1997 |
| WO | 01/68347 A1 | 9/2001 |
| WO | 03/099544 A1 | 12/2003 |
| WO | 2004/005149 A1 | 1/2004 |
| WO | 2005/019053 A2 | 3/2005 |
| WO | 2006/082255 A1 | 8/2006 |

OTHER PUBLICATIONS

International Search Report and Written Opinion for PCT/NL2010/050659 mailed Jun. 27, 2011, 14 pages.
Menges et al., "How to make injection molds, The Ring Gate", How to Make Injection Molds, Jan. 1, 2000, pp. 208-210, XP002396828, figures 6.9, 6.11.

* cited by examiner

INJECTION MOULD FOR FLEXIBLE TUBE

The invention relates to an injection moulding device for injection moulding a flexible sleeve body for a squeezable tube, a method for injection moulding a flexible sleeve body for a squeezable tube using such a mould, and a flexible sleeve body and a squeezable tube comprising such a sleeve obtained by using an injection moulding device according to the invention.

Plastic squeezable tubes are known from the prior art, and are used for some time for dispensing fluid materials such as hand lotions, shampoos, toothpaste, cream, gel, cosmetics, or similar products. A typical squeezable plastic tube comprises a sleeve body having flexible walls and a shoulder comprising a dispense opening. To dispense the product held in the tube, the sleeve body is squeezed such that the product is forced through the dispense opening.

The tubes are preferably injection moulded because this allows for providing a flexible sleeve body and an integrated shoulder in one production step. The moulding process provides a flexible tube body comprising a top end with the shoulder and an open opposite end. The open end is sealed in a subsequent process step, most often by heat sealing or ultrasonic welding. Typically, prior to sealing the tube body, the tube is filled via the open end with the product to be dispensed.

Tubes are provided with a closure to seal off the dispense opening to protect against spillage and to protect the product held in the tube for example from dehydration. Such a closure comprises a lid which is screwed or clicked on the shoulder part of the tube. The shoulder is more rigid than the flexible thin walled sleeve body, to allow secure closing of the tube. Some tubes are provided with a lid which hingeably connected to the shoulder.

A drawback of the injection moulding process is that providing a flexible sleeve body with thin walls requires a large injection pressure which may cause the core on which the sleeve body is formed to shift inside the mould.

Furthermore, the flow of molten plastic material is not evenly distributed into the cavity for forming the sleeve such that a irregular flow-front is created, which causes enclosures of air pockets and local pressure areas in the final product. Thus it is difficult to obtain thin flexible walls with a minimum of internal stress and having a smooth outer surface without flow tracks. These deficiencies are unacceptable for many products, particularly those with an "up market" image such as cosmetics.

Furthermore, the high injection pressures needed for filling the section of the mould forming the thin flexible walls of the tube, makes the application of in-mould labels to flexible tube bodies is problematic. Due to the high injection pressures the flow of molten plastics material along the label may displace or damage the label.

It is an object of the present invention to provide an alternative injection moulding device for injection moulding a squeezable tube or parts thereof, preferably without one or more of the above mentioned drawbacks of prior art.

The invention achieves this object by providing an injection moulding device for injection moulding a flexible sleeve body for a squeezable according to claim 1.

The injection moulding device according to the invention comprises a male mould part, a female mould part and a runner end part. The combined female mould part and male mould part form a sleeve body cavity for forming the flexible sleeve body between them. The sleeve body cavity extends from a top end to an opposite bottom end in a longitudinal direction. The runner end part of the injection mould, forms, in combination with the female mould part and the male mould part, a runner cavity at the top end of the sleeve body cavity. In the runner cavity a runner body is formed.

The runner cavity comprises an injection opening for injecting a flow of molten plastics material into the runner cavity and the sleeve body cavity, an annular shaped distribution channel located along the top end perimeter of the sleeve body cavity, one or more runner channels connecting the injection opening with the annular shaped distribution channel, and a passage connecting the annular shaped distribution channel with the sleeve body cavity for guiding the molten plastics material from the distribution channel into the sleeve body cavity.

The flexible sleeve body according to the invention can be provided with a shoulder body in a subsequent production step, for example by heat sealing a separate injection moulded shoulder onto the sleeve body. Preferably, the runner body formed in the runner cavity is part of the final product. The invention provides a runner body which allows the shoulder to be fixed onto the sleeve body and the runner body. Thus, no extra step is required for removing the runner body prior to providing the shoulder. The runner body furthermore provides extra rigidity to the top end of the flexible sleeve and provides additional attachment surfaces for the shoulder in the final product.

In a preferred embodiment according to the invention, the shoulder is formed in the same injection moulding device as the flexible sleeve by way of two stage injection moulding. With a two stage injection mould according to the invention the shoulder is preferably formed such that the runner body is at least partially embedded in the shoulder part and functions as an anchor for holding the shoulder body.

In one embodiment, the two stage injection mould according to the invention is designed for injection moulding a runner body in the runner cavity and the flexible sleeve body in the sleeve body cavity in a first stage, and injection moulding the shoulder body in a shoulder body cavity adjacent the runner body and the flexible sleeve body in a second stage, such that the shoulder body is injection moulded integral with the runner body and the flexible sleeve body.

Preferably the injection mould is provided with a shoulder end part, which in combination with the female mould part and the male mould part forms the shoulder body cavity for forming the shoulder body, which shoulder end part comprises an injection opening for injecting a flow of molten plastics material into the shoulder body cavity.

In an alternative embodiment the runner end part is provided with one or more moveable components, which components can be moved to form a shoulder cavity adjacent the runner cavity, after the runner body and the sleeve body are formed.

The invention furthermore provides a two stage injection moulding device for injection moulding the shoulder body in a first stage, and injection moulding a runner body and a flexible sleeve body in a second stage, such that the runner body and the flexible sleeve body are injection moulded integral with the shoulder body.

In this embodiment the injection moulding device comprises a shoulder base part, a shoulder end part, a male mould part and a female part. In this embodiment, the runner body cavity is not formed by a runner end part in combination with the male and female part, but by the shoulder end part comprising an injection moulded shoulder body in combination with the male and female part.

In the first stage, the shoulder end part in combination with the shoulder base part forms a shoulder body cavity for forming the shoulder body between them. The shoulder end part comprises an injection opening for injecting a flow of molten plastics material into the shoulder body cavity. Furthermore, the injection mould comprises a pin to provide the shoulder body with an opening adjacent a second injection opening in the shoulder end part.

The female mould part in combination with the male mould part forms a sleeve body cavity for forming the flexible sleeve body between them, which sleeve body cavity extends from a top end to an opposite bottom end in a longitudinal direction. It is observed that the male and female part can be of similar design as with the previously described two stage injection mould.

In the second stage, the shoulder end part including the injection moulded shoulder body, in combination with the female mould part and the male mould part forms a runner cavity at the top end of the sleeve body cavity. This runner cavity comprises the opening of the shoulder body for injecting a flow of molten plastics material from the second injection opening in the shoulder end part through said opening into the runner cavity for injection moulding the runner body and the flexible sleeve body integral with the shoulder body.

The runner cavity comprises, similar to the runner cavity in the alternative injection mould described above, an annular shaped distribution channel located along the top end perimeter of the sleeve body cavity, one or more runner channels which extend between the opening in the shoulder body and the annular shaped distribution channel, and a passage. The passage is constituted by one or more openings connecting the annular shaped distribution channel with the sleeve body cavity for guiding the molten plastics material from the distribution channel into the sleeve body cavity, which one or more openings is/are evenly distributed along the perimeter of the sleeve body cavity and is/are narrow compared to the distribution channel upstream of the passage such that the passage initially prevents the flow of molten plastics material from entering the sleeve body cavity, which results in a pressure build up in the runner cavity. This pressure build up eventually results in a pressure high enough to force the flow of molten plastics material through the passage into the sleeve body cavity.

This two stage injection moulding device for injection moulding the shoulder body in a first stage, and injection moulding a runner body and a flexible sleeve body in a second stage, is especially suitable for injection moulding a tube with an integral shoulder, wherein the shoulder is made of a first material and the runner body and the flexible sleeve body of a second material, which first material has a substantially smaller E modulus than the second material. When a softer body is formed in the first stage, there is the risk of the body being transformed under the injection moulding pressures due to injection moulding a more rigid shoulder body in the second stage. When the shoulder body is formed by a more rigid material than the sleeve body, it is preferably formed during the first stage. This provides a better combining of the bodies and a the final product with a crisp line where the bodies border each other.

It is observed that the passage of all injection moulds according to the invention is narrow compared to the distribution channel upstream of the passage such that the passage initially prevents the flow of molten plastics material from entering the sleeve body cavity. This results in a pressure build up in the runner cavity which eventually results in a pressure high enough to force the flow of molten plastics material through the passage into the sleeve body cavity.

The passage is constituted by one or more openings which is/are provided between the annular shaped distribution channel and the sleeve body cavity and are evenly distributed along the perimeter of the sleeve body cavity. When the distribution channel is filled, the pressure inside the distribution channel is essentially the same along the passage, i.e. near all openings. Thus when the pressure in the runner cavity is high enough to force the molten plastics material through the passage, the sleeve body cavity is filled via the one or more evenly distributed openings at the same moment and the sleeve body cavity is evenly filled via the passage.

The runner cavity comprises an injection opening for injecting a flow of molten plastics material into the runner cavity and the sleeve body cavity, an annular shaped distribution channel located along the top end perimeter of the sleeve body cavity, one or more runner channels connecting the injection opening with the annular shaped distribution channel, and a passage connecting the annular shaped distribution channel with the sleeve body cavity for guiding the molten plastics material from the distribution channel into the sleeve body cavity.

The runner cavity thus enables a well-balanced filling of the sleeve body cavity with a flow of molten plastics material which fills the cavity in an essentially axial direction, which provides a more uniform pressure in the sleeve body cavity and the injected material. The even flow of molten plastics material in the sleeve body section of the mould cavity minimizes localised internal pressures in the flexible walls of the final product. Thus, a tube body having a good quality is obtained The present invention is particularly, although not exclusively, applicable to injection moulding devices for moulding flexible sleeve bodies having a wall thickness of 1 mm or less, preferably 0.6 mm or less. Preferably, the passage in the injection mould is constituted by one or more slit and/or circular openings which has/have a width or diameter of about 0.3 mm, more preferably between 0.05 mm and 0.3 mm preferably in combination with a flexible sleeve body cavity dimensioned for providing a flexible sleeve body having a wall thickness between 0.3 mm and 1 mm. Preferably, the passage is dimensioned such that the flow of molten plastics material only enters the sleeve body cavity after the runner body section of the cavity is fully filled and the pressure in the distributing channel is at least 200 bar, preferably at least 300 bar, more preferably at least 350 bar. Thus the pressure is high enough to fill the runner cavity section and to provide an evenly distributed flow front, while enough pressure remains for pushing the flow through the entire sleeve body cavity and fill it.

The invention is in particular useful when used with in-mould labelling. The even distribution of the flow of molten plastics material in the sleeve body cavity provides an essentially ring shaped flow front which travels in the longitudinal direction of the sleeve body cavity. This prevents a label placed in the mould from unwanted movement and/or from wrinkling due to localised pressures caused by multiple flows or for example a flow front which flows faster on one side of the cavity than on the opposite side of the cavity.

Preferably, the annular shaped distribution channel of the runner cavity is connected to the sleeve body cavity via a passage constituted by a single ring shaped slit, which extends along the perimeter of the sleeve body cavity. Thus there is only one opening which is evenly distributed along the perimeter of the sleeve body. The single opening allows for a single uniform flow front and thus for an optimal distribution of the molten plastics material into the sleeve body cavity.

In an alternative embodiment, the distribution channel is connected to the sleeve body cavity via a passage constituted by multiple openings, which are evenly distributed along the perimeter of the sleeve shaped cavity. By providing the openings near to each other and by the flow being forced through each opening at the same moment, the flow fronts emerging from each opening into the sleeve body cavity quickly combine into a single flow front which flows in the longitudinal direction of the sleeve body.

In a further embodiment according to the invention, the passage is constituted by multiple openings which each are part of a channel, and which channels are preferably located within the perimeter of the sleeve body cavity. The channels form rib elements in the final product which provides the tube with additional rigidity. The channel shaped connections between the annular distribution ring furthermore allow for the sections of the male core part located between the channels to be supported by the end mould part during the injection moulding of the flexible sleeve body.

Preferably, the passage is narrow compared to the sleeve body cavity directly downstream of the passage such that the flow of molten plastics material, when pressed through the passage, can freely flow into the wider part of the sleeve body cavity.

Preferably, the runner section of the cavity, in particular the distribution channel, is located essentially within the perimeter of the tube shaped body cavity. This allows for fitting a closure over the runner body such that the outer surface of the closure is flush with the outer surface of the sleeve body.

Preferably, the distribution channel has a tapered cross section, such that it narrows towards the sleeve body cavity. This embodiment allows for distribution of the molten plastics material in the wider part of the channel first. The more constricted part of the distribution channel, which is located adjacent the openings, fills up after the first part is filled and the pressure in the distribution channel amounts. This configuration of the distribution channel further ensures that the molten plastics material enters the sleeve body cavity along the entire passage at essentially the same moment to provide an evenly distributed flow in the sleeve body section of the cavity.

Preferably, the cross section of the distribution channel is substantially smaller than the cross section of each runner channel. Thus, there is already a pressure build up in each of the runner channels when the flow is pressed into the distribution channel. This furthermore provides an even distribution of the flow over the runner channels prior to the flow entering the distribution channel section.

Preferably, the one or more runner channels bifurcate into multiple branches which preferably end at regular intervals in the distribution channel. Thus the flow of molten plastics material is divided into sub flows by the runner channels, and is distributed over the distribution channel. Thus, the distribution channel is more evenly filled and the pressure build up is more evenly distributed along the distribution channel, and thus along the openings. This further helps to make the brake through of the flow into the sleeve body cavity to appear along the entire perimeter at the same moment.

Preferably the length and the cross section of the runner channels are dimensioned such that the flow of molten plastics material enters the distribution channel via each channel at essentially the same moment.

Preferably, the injection moulding device is equipped for in mould labelling, to provide the sleeve body with a label, preferably with a label having specific barrier properties to provide the sleeve body with better barrier properties against for example gases or water vapour than the basic material of the tube. Moreover, it is also possible to use sheets or sleeves as label whose surface is already printed as with a label or has a decorative surface with structures or different materials to provide the tube with an outside surface with improved grip.

In a further preferred embodiment according to the invention, the shoulder part is provided by sandwich injection moulding, wherein the shoulder is provided with at least one barrier layer and at least one carrier layer. By combing the in-mould labelling with sandwich injection moulding of the shoulder body, the sleeve body as well as the shoulder are provided with better barrier properties against for example gases or water vapour than the basic material of the sleeve body and/or shoulder body.

In a further preferred embodiment, the injection mould is designed for providing a tube with a barrier label and an integral shoulder part with barrier layers, wherein the latter is provided by combining the two stage injection moulding with the sandwich injection moulding. With such an injection mould the shoulder is for example injection moulded by subsequently injecting PP material, a barrier material such as EVOH, and again a PP material. Other combinations of materials are possible to provide a tube, in particular the shoulder part of the tube, with improved barrier properties. Thus a three component product is provided, wherein the combined runner and sleeve body are formed from a first material, and the shoulder body from two types of material. Furthermore, the tube, more in particular the sleeve body, is provided with a label which is composed of one or more film shaped layers, which layers may be formed from different materials.

The invention furthermore provides a method for providing a flexible tube, using an injection mould according to the invention, and a flexible tube obtained by a method using an injection moulding device according to the invention.

The method comprises providing the runner cavity adjacent the sleeve body cavity and injecting molten plastics material into the runner cavity. A passage is provided between the runner cavity and the sleeve body cavity, which passage is so narrow that it initially prevents the flow of molten plastics material from passing the passage and entering into the sleeve body cavity.

Thus, the runner cavity is fully filled with the molten plastics material and a pressure build up is provided in the runner cavity until the pressure is high enough to force the molten plastics material through the passage and into the sleeve body cavity. Then, the sleeve body cavity is filled with the molten plastics material via the passage to form the runner body and the flexible sleeve body.

A further method according to the invention comprises the subsequent steps of providing a shoulder body cavity comprising part of the runner body and the flexible sleeve body formed in the previous steps, injecting a flow of molten plastics material into the shoulder body cavity and filling the shoulder body cavity to form a shoulder body onto the runner body and the sleeve body.

An alternative method comprises the preceding steps of providing a shoulder body cavity, injecting a flow of molten plastics material into the shoulder body cavity and filling the shoulder body cavity to form a shoulder body. The shoulder body is subsequently provided adjacent the sleeve body cavity to form the runner cavity adjacent the sleeve body cavity and to allow for injection moulding the runner body and the flexible sleeve body integral with the shoulder body.

The invention furthermore provides a flexible sleeve body and a squeezable tube comprising such a sleeve, obtained by using an injection moulding device according to the invention.

The invention furthermore provides a squeezable tube body.

Thus the invention provides an injection moulding device provided with a runner cavity via which the sleeve body cavity is evenly filled, and which forms in the runner body that is used to anchor the shoulder body when injection moulded onto the sleeve body.

Further objects, embodiments and elaborations of the apparatus and the methods according to the invention will be apparent from the following description, in which the invention is further illustrated and elucidated on the basis of a number of exemplary embodiments, with reference to the drawings, in which.

The invention is explained with FIGS. 1-4 by way of a flexible sleeve body provided by an injection mould according to the invention. It is observed that the tube body depicted forms an inverted image of the mould by which it was shaped.

Figure 1:
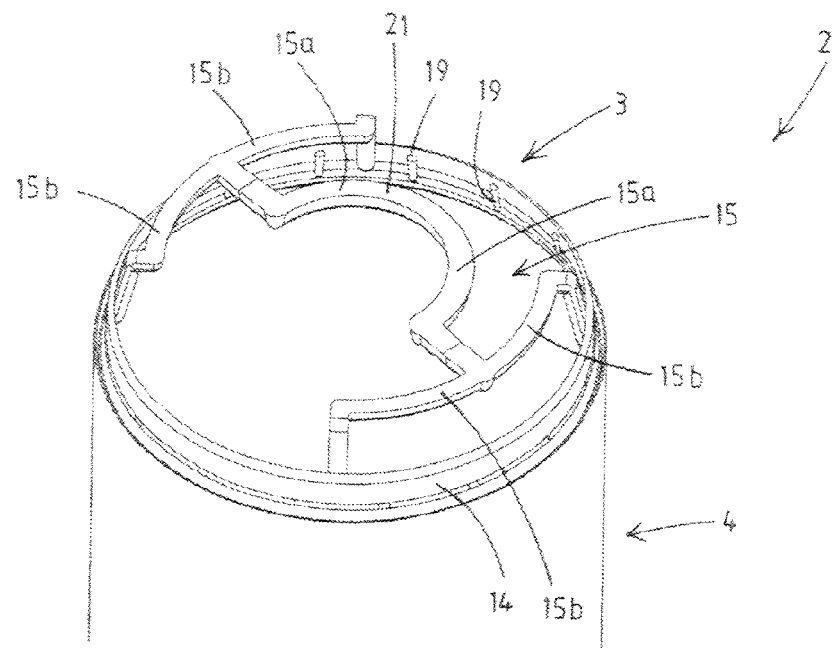
FIG. 1 shows a perspective view of a top end of a tube body according to the invention in which a runner body is connected to a sleeve body via multiple rib elements.
Figure 2:
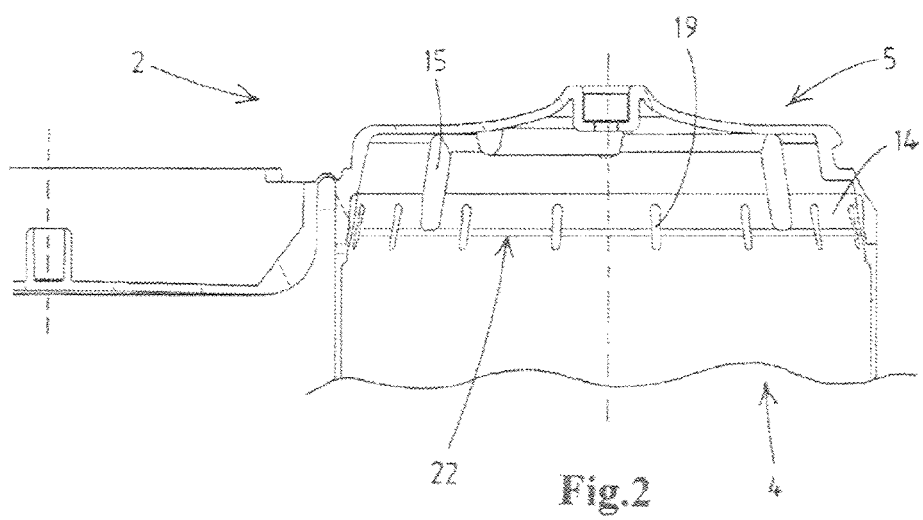
FIG. 2 shows a side view in cross section of the sleeve body shown in FIG. 1 including a shoulder body hingeably linked with a lid.

FIG. 1 shows a tube body 2 comprising a sleeve body 4 and a runner body 3 provided at the top end of the sleeve. The tube body depicted in FIG. 1 is shown in FIG. 2 with an integrated shoulder body 5, which shoulder body is provided by two stage injection moulding.

The sleeve body 4 extends in a longitudinal direction from a top end which is shown in the Figs, to a bottom end which is not shown. The flexible tube is filled via the bottom end, which is sealed to finish the flexible, squeezable tube. The sleeve body shown is essentially cylindrical shaped with a circular cross section. An injection mould according to the invention can also be designed to provide alternative shaped cross sections, such as for example an elliptical or rectangular shaped cross section.

The runner body 3 comprises runner channels 15 and an annular shaped distribution channel 14 located adjacent the perimeter of the sleeve body 4. Both are separate bodies, such that there is a space 22 between the distribution body and the sleeve body. The runner channels 15 extend between the injection mark 21 and the annular distribution channel 14. At the injection mark 21 the injected flow of molten plastics material entered the runner mould cavity for moulding the flexible tube.

The one or more runner channels of a mould according to the invention preferably bifurcate into multiple branches which end at regular intervals in the distribution channel to evenly distribute the flow of molten plastics material over the distribution channel. Thus the channels optimally distribute the molten plastics material over the distribution channel which is filled at multiple locations.

Furthermore, the length and the cross section of the runner channels are preferably dimensioned such that the flow of molten plastics material enters the distribution channel via each channel at essentially the same moment.

The particular embodiments of a flexible tube body shown in FIGS. 1-4 comprise a runner body which is formed by two runner channels 15*a* which diverge in opposite directions from the injection opening, and both bifurcate into two branches 15*b* which come out into the annular distribution channel 14. The locations at which the branches of the runner channels come out into the distribution channel are evenly distributed along the annular channel, i.e. separated by an angle of about 90 degrees when seen in top view. Thus, in the injection mould for forming the tube, the flow of molten plastics material ejected via the injection opening is split in four and the distribution channel is uniformly filled via four inlets.

The two runner channels 15 in each tube mirror each other relative to a vertical plane extending through the central axis of the tube and the injection mark 21. Since the two runner channels have similar dimensions and lay-out, during the injection moulding process the flow of molten plastics material essentially travels each channel at the same speed and the flow rate at each opening is similar.

In the particular embodiment shown, the runner channels 15 are provided with a semi circular first section, when seen in top view. The C-shaped trajectory extends over an angle of 180 degrees, such that the opposite ends of this section are located diametrically opposite each other relative to the central axis of the tube body. This lay out allows for locating the injection opening in the mould off-centre with respect to the central axis of the cylindrical shaped sleeve body cavity. Locating the injection opening off-centre is advantageous since it allows for providing the flexible tube with a central dispense opening, i.e. a dispense opening in line with the longitudinal axis. The C-shaped lay-out combines the off-centre location of the injection opening with distribution channels which have the same length, and thus allow for even distribution of the flow over the distribution channel.

In an alternative embodiment, the injection opening is provided in line with the central axis of a cylindrical sleeve body, and the distribution opening of the tube is located off-centre.

FIGS. 1 and 2 show that the runner body 3 and sleeve body 4, which are located adjacent each other, are connected to each other via rib elements 19. For providing the particular embodiment shown in FIGS. 1 and 2, a mould is provided comprising a mould cavity having a runner body section and a sleeve body section, which sections are connected via a passage constituted by multiple openings. The openings in the mould for providing the preferred embodiment shown are each part of a channel, which channels provide the flexible tube with the rib elements 19 extending along part of the runner body 3 and along part of the sleeve body 8. The rib elements 19 furthermore provide the tube body with structural rigidity.

In the mould, the multiple channels are evenly distributed along a perimeter at the top end of the sleeve body cavity. The channels connect the runner cavity, in particular the distribution channel of the runner cavity, with the sleeve body cavity. The openings in the channels, i.e. the flow through area of the channels, are dimensioned such that they impede the initial flow of molten plastics material from entering the sleeve body cavity before the distribution channel is filled. Thus the body section is evenly filled via all channels.

In the embodiment shown, the runner body 3 and its rib elements 19 are located on the inside of the perimeter of flexible sleeve body, i.e. within the inner circumference of the sleeve body when seen in top view. Thus, a shoulder body can be provided against the runner body and the top rim of the sleeve body with its outer surface flush with the outer surface of the sleeve body. In an alternative embodiment, the rib elements are located on the outside of the runner body, and/or the runner body is formed essentially in line with the sleeve body walls.

With the embodiment shown in FIGS. 1 and 2, the shoulder is injection moulded in a two stage injection moulding process over the sleeve body and the runner body. The shoulder is injection moulded against the sleeve body and the runner body and the outside of the shoulder is in line with the outside surface of the sleeve body, which is clear from FIG. 2. During the injection moulding of the shoulder body, the top surfaces of the prior formed runner body and the sleeve body melt and intermingle with the material injected into the shoulder body cavity such that a structural connection between the shoulder and the runner body and sleeve body is achieved. Thus, a runner body according to the invention supports the shoulder body and couples it to the sleeve body.

In one embodiment according to the invention, the passage is constituted by openings shaped like channels having an essentially semi circular cross section. Of these types of openings, shown in FIGS. 1 and 2, preferably eight or more, more preferably sixteen or more are provided along the perimeter of the sleeve body to provide enough inlets to form a uniform flow front on the sleeve body.

In alternative embodiment according to the invention, the passage is constituted by longitudinal, slit shaped openings which extend along at least a section of the perimeter of the sleeve body. For example, four openings may be provided which each extend over angle of 20 degrees along the length of the perimeter of the sleeve body. Thus the openings together cover 80% of the length of the perimeter.

Preferably the distance along the perimeter between subsequent openings is less than 15 mm, more preferably 10 mm or less, to further reduce the chance on air pockets in the final product. In a further embodiment the passage is constituted by one longitudinal slit shaped opening which extends along the entire length of the perimeter of the sleeve body.

In a further embodiment, the passage is constituted by openings having a semi circular cross section as well as slit shaped openings. It is observed that the openings which constitute the passage are preferably located in a horizontal plane which extends perpendicular to the longitudinal axis of the flexible sleeve body cavity. This configuration further provides an evenly distributed flow front.

It is observed that the dimensions of the passage, more in particular the openings constituting the passage, depend on the dimensions cavities, as well as on the pressure, temperature and material used to make the object. Preferably, the passage is constituted by one or more slit and/or circular openings which has/have a width or diameter of about 0.3 mm, preferably less than 0.3 mm. The passage is dimensioned such that the flow of molten plastics material only enters the sleeve body cavity after the runner body section of the cavity is fully filled and the pressure in the distributing channel is preferably at least 200 bar, more preferably at least 300 bar, more preferably at least 350 bar. Thus the pressure is high enough to fill the runner cavity section and to provide an evenly distributed flow front, while enough pressure remains for pushing the flow through the entire sleeve body cavity and fill it.

Figure 3:
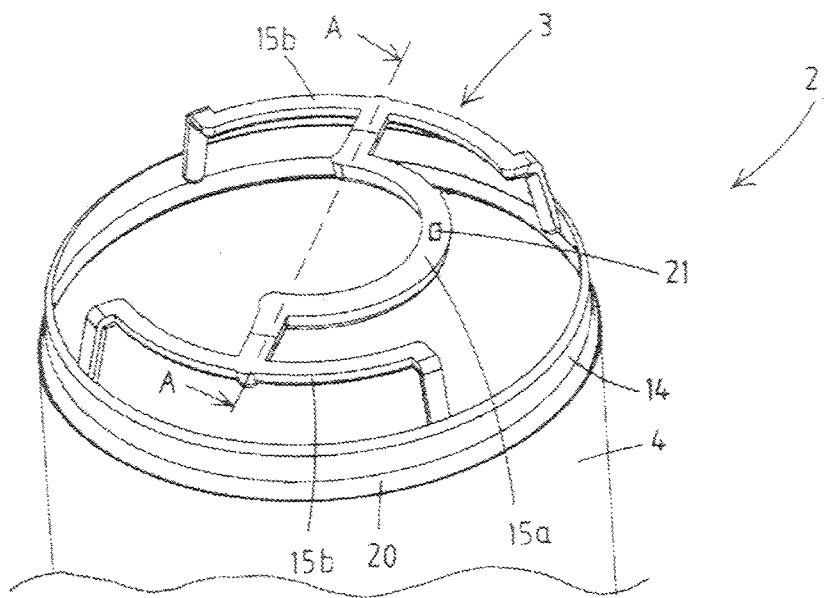
FIG. 3 shows a perspective view of a top end of an alternative tube body according to the invention in which a runner body is connected to a sleeve body a single film shaped connection.
Figure 4:
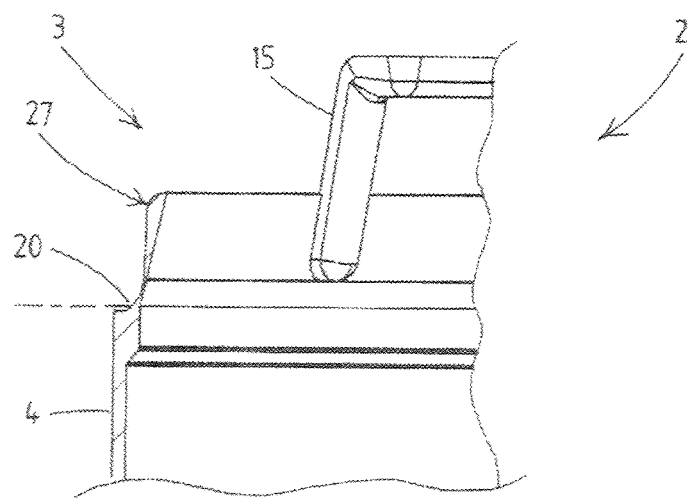
FIG. 4 shows a view in cross section of the sleeve body shown in FIG. 3.

FIGS. 3 and 4 shows a flexible tube section 2 according to the invention in which the runner body 3 and the sleeve body 4 are connected via a thin, film shaped connection 20, which is formed by an injection mould according to the invention comprising a passage constituted by a single slit shaped opening which is located between the runner section and the sleeve section of the mould cavity. In the mould, the connecting slit shaped opening runs along the entire perimeter of the sleeve shaped cavity for forming the sleeve body.

Due to the continuous shape of the film shaped connecting part, the runner system and the flexible sleeve body are connected along the entire perimeter of the sleeve shaped body, which provides a reliable and strong connection.

In the preferred embodiments shown in FIGS. 1-4, the runner body section, more in particular the distribution channel, is located essentially within the perimeter of the tube shaped body cavity. The embodiment shown in FIGS. 3 and 4 is preferably provided with a shoulder similar to the one shown in FIG. 2. The outer surface of the shoulder is in line with its outer surface of the sleeve body, as is shown in FIG. 2. The flexible tube is thus provided with a flush outer surface which is more appealing to the consumer.

The preferred embodiments are furthermore provided with a distribution channel having a tapered cross section, such that it narrows toward the sleeve body cavity. This is tapered cross section 27 is clearly shown in FIG. 4. Due to the tapered shape, the flow of molten plastics material entering the distribution channel from the runner channels first diverges in the annular direction filling the distribution channel along its top side. When this section is filled and the pressure increases, the molten plastics material is forced into the narrow section of the channel and towards the slit shaped opening up in the sleeve shaped body cavity.

Furthermore, in both preferred embodiments shown in FIGS. 1-4, the cross section of the distribution channel is substantially smaller then the cross section of the runner channels. Thus, during the injection moulding process, there is already a pressure build up when the flow in each of the runner channels when the flow enters the distribution channel.

Figure 5:
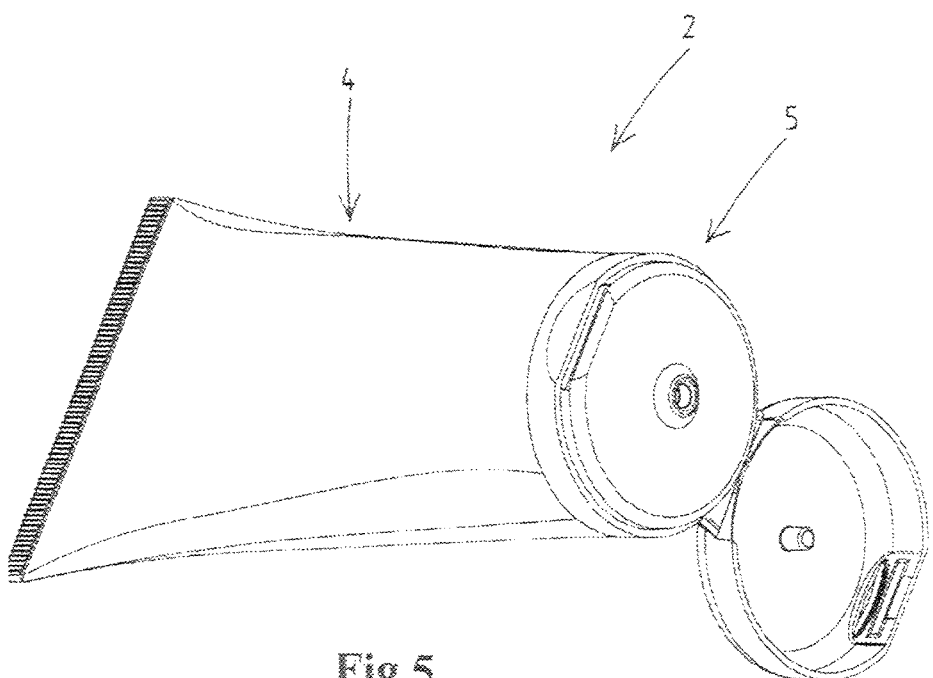
FIG. 5 shows a perspective view of a flexible tube according to the invention.

In a preferred embodiment according to the invention, the injection moulding device is provided with a mould designed for two stage injection moulding to provide the flexible tube with an integral shoulder such as shown in FIGS. 2 and 5. It is observed that the tube body depicted forms an inverted image of the mould by which it was shaped.

Figure 6:
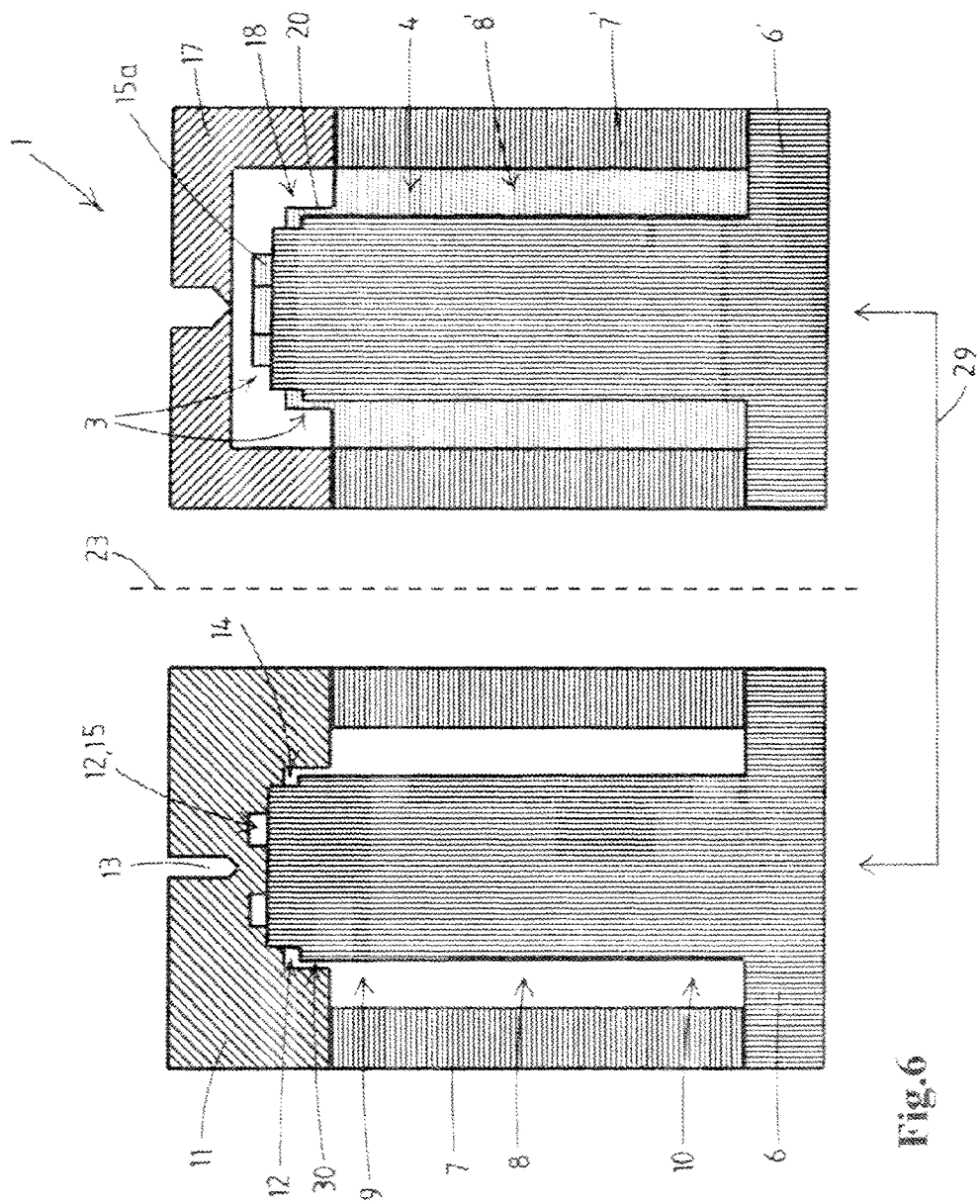
FIG. 6 shows a cross sectional view of a simplified two stage injection mould according to the invention for providing a squeezable tube body shown in FIGS. 3 and 4, comprising a flexible sleeve body, a runner body and a shoulder body.

FIG. 6 shows a cross sectional view of a simplified two stage injection mould 1 according to the invention for injection moulding a squeezable tube body comprising a flexible sleeve body, a runner body and a shoulder body by two stage injection moulding.

In the two stage injection mould shown in FIG. 6, a cavity comprising a flexible sleeve body cavity 8 and a runner body cavity 3 for respectively injection moulding the flexible sleeve and the runner body of the squeezable tube body is provided on the left. A shoulder body cavity 18 for injection moulding a shoulder body onto the flexible sleeve body and the runner body formed on the left side of the injection mould, is provided on the right. In a first stage, the female 7 and male 6 mould part are combined with the runner end part 11. In a second stage the female and male mould part, comprising the injection moulded sleeve body and shoulder body, are combined with the shoulder end part 17 on the right. The movement of the male and female mould part is indicated with arrow 29.

When the male and female mould are positioned for the second stage of the injection moulding process, the runner body and the sleeve body are at least partially located within the shoulder cavity, such that they are embedded in, or are located adjacent to the inside of the final shoulder part.

It is observed that a single stage injection mould for providing a flexible sleeve body comprising a shoulder body is similar to the left part of the two stage injection mould shown in FIG. 6.

The injection moulding device is now described in more detail. The injection mould comprises a male mould part 6, a female mould part 7 and a runner end part 11. Combined, these mould parts form a mould cavity for forming a tube body according to the invention, i.e. a tube body comprising a runner body and a flexible sleeve body, which bodies are part of the final product. The runner cavity of an injection mould according to the invention enables a well-balanced filling of the sleeve body cavity with a flow of molten plastics material.

The exemplary mould 1, shown in FIG. 6 is designed for injection moulding the flexible sleeve body 4 and the runner body 3, shown in FIGS. 3 and 4, in a first stage, and injection moulding the shoulder body (not shown in FIGS. 3 and 4, but similar to the shoulder body show in FIG. 2) onto the flexible sleeve body and the runner body in a second stage of the injection moulding process. The left part of the mould 1 is used for the first stage of the injection moulding, the right part of the mould is used for the second stage. In the figs. shown, the cross section of the mould 1 provides a view of the flexible sleeve body 4 and the runner body 3 shown in FIG. 3, in cross section along line AA.

By providing a shoulder body cavity 18 for receiving the top end of the runner body 3 and the sleeve body 4 while still mounted on the male core part 6 of the injection mould 1, and injection moulding the shoulder body 5 onto the runner body 3 and the sleeve body 4. Thus, a squeezable tube body is formed in a single injection moulding process, which tube body can subsequently be filled and sealed.

Therefore, in the preferred embodiment shown, the injection mould is provided with two male mould parts 6, 6' and two female mould parts 7, 7', which are located parallel to each other for providing two sleeve body cavities located next to each other. The injection mould 1 furthermore comprises a runner end part 11 and a shoulder end part 17 located next to each other, one combined with the first male 6 and female mould part 7, and the other combined with the second 6' female and male mould part 7'.

The male and female mould parts in combination form a first and second sleeve body cavity 8, 8' for forming a flexible sleeve body. The sleeve body cavities are each essentially cylindrical shaped and extend from a top end 9 to an opposite bottom end 10 in a longitudinal direction. The sleeve bodies remain located between the male and female mould part during stage one and two of the injection moulding process, and are ejected from the mould after the second stage.

Combined with the female mould part 7 and the male mould part 6, the runner end part 11 forms a runner cavity 12 at the top end of the sleeve body cavity 8 for forming a runner body. The runner cavity comprises an injection opening 13 for injecting a flow of molten plastics material into the runner cavity 12 and the sleeve body cavity 8. The runner cavity furthermore comprises an annular shaped distribution channel 14 located along the top end perimeter of the sleeve body cavity 8, multiple runner channels 15 which extend between the injection opening 13 and the annular shaped distribution channel 14. It should be clear from the flexible tube body shown in FIGS. 3 and 4 how these channels are shaped.

The runner cavity 14 is connected to the sleeve body cavity 8 via a passage 14 constituted by a single slit shaped opening, provided between the annular shaped distribution channel 14 and the sleeve body cavity 8, connecting the runner cavity 12 with the sleeve body cavity 8. This opening 30 extends along the entire perimeter of the sleeve body cavity 8 and is dimensioned such that it impedes the flow of molten plastics material injected through the injection opening 13 into the runner cavity 12 from entering the sleeve body cavity 8 before the runner cavity is filled, such that the sleeve body cavity 8 is evenly filled via the passage.

Combined with the second female mould part 7' and the male mould part 6', the shoulder end part 17 of the injection mould shown in FIG. 6 forms a shoulder body cavity 18 for forming a shoulder body over a runner body and a sleeve body. The shoulder end part 17 comprises an injection opening for injecting a flow of molten plastics material into the shoulder body cavity 18, such that the shoulder body is moulded integral with the runner body and the flexible sleeve body.

The injection mould shown in FIG. 6 is designed such that the runner end part and the shoulder end part can change position relative to the respective sleeve body cavities, such that both can be combined with the first male and female mould parts and with the second male and female mould parts. Preferably this is achieved by pivotably mounting the first and second male and female mould part such that they can be pivoted about an axis 23 parallel to the longitudinal axis of the sleeve body cavities. The injection moulding process comprises the following steps. The injection mould 1 is closed by positioning the combined male 6, 6' and female 7, 7' mould parts against the runner end part 11 and the shoulder end part respectively 17, by moving them parallel to the axis 23. The first sleeve body cavity 8 is located adjacent the runner cavity 12 and the second sleeve body cavity 8' is located adjacent the shoulder body cavity 18.

A flow of molten plastics material is injected into the runner cavity 13 via the injection opening 13. The flow is guided to the annular distribution channel 14 of the runner cavity 12 via the runner channels 15. The front of the flow thus arrives at the passage connecting the runner body cavity 12 to the sleeve body cavity 8. The passage, in the mould shown in FIG. 6 constituted by a single slit shaped opening, is so narrow that it initially prevents the flow of molten plastics material from passing the passage and entering into the sleeve body cavity.

The runner cavity 12 is now filled with the molten plastics material injected vie the injection opening 13. When the runner cavity 12 is fully filled, a pressure build up is provided in the runner cavity by the molten plastics material injected into the cavity. When the pressure in the runner cavity is high enough, preferably 300 bar or higher, preferably 350 bar or higher, the molten plastics material is forced through the passage, i.e. the slit shaped opening, and into the sleeve body cavity 8.

After the sleeve body cavity is filled 8, and the molten plastics material is set, the injection mould is opened by moving the first and second male 6, 6' and female 7, 7' mould parts away form the runner end part 11 and the shoulder end part 17 respectively, again moving them parallel to the axis 23.

The first and second male and female mould parts are then rotated relative to the pivot axis 23 extending parallel to the longitudinal axis of the sleeve body cavities 8, 8', such that the first sleeve body cavity is positioned in line with the shoulder end part and the second body cavity is brought in line with the runner end part. Subsequently the mould is closed by moving the mould parts parallel to the axis 23. Thus, a shoulder body cavity comprising part of the runner body and the flexible sleeve body formed in the previous steps is provided. In FIG. 6, the runner body and the sleeve body are formed and in the second male and female part, and are now positioned partially in the shoulder cavity for injection moulding a shoulder over the runner body and the top end of the sleeve body.

With the sleeve body and the runner body at least partially in the shoulder cavity, a flow of molten plastics material, preferably PP or a similar material, is injected into the shoulder body cavity and the shoulder body cavity is filled to form a shoulder body onto the runner body and the sleeve body.

At the same time, in the preferred embodiment shown, a flow of molten plastics material is injected into the runner cavity, as described above, to form a second runner body and a flexible sleeve body with the second male and female mould part in a parallel injection moulding process.

When the molten plastics material is set in all cavities, the injection mould is opened by moving the first and second female mould parts away from the runner end part and the shoulder end part. Subsequently, the squeezable tube body comprising the flexible tube body, the runner body and the shoulder body is ejected form the first male and female mould part.

The injection mould process restarts, and the first male and female mould part are recombined with runner end part to form another flexible sleeve body and runner body, while a shoulder body is formed on the sleeve body and the runner body in the second male and female mould part. Thus the two stage injection moulding process can be continued endlessly.

It is observed that the particular injection mould shown in FIG. 6 is designed for providing passage constituted by a single slit shaped opening which extends along the perimeter of the sleeve body. An injection mould with a similar lay-out could be provided with a distribution channel connected to the sleeve body cavity via multiple openings, for injection moulding a tube body as shown in FIGS. 3 and 4. The one or more openings are provided between the annular shaped distribution channel and the sleeve body cavity and are evenly distributed along the perimeter of the sleeve body cavity. An opening is an opening having a cross section comparatively small compared to the cross section of the mould cavity directly upstream and preferably compared to the mould cavity directly down stream of the opening. The openings are dimensioned such that they impede the flow of molten plastics material injected through the injection opening into the runner cavity from entering the sleeve body cavity before the annular distribution channel is filled.

It is furthermore observed that with the preferred injection mould shown in FIG. 6, the shoulder part is injection moulded after the flexible sleeve body and the runner system. When the runner system and the flexible sleeve body are injection moulded the male core part is supported in the runner end of the injection mould. The runner system does not cover the whole surface of the end of the male core part, and thus allows for supporting the end of the male core part on the runner end of the injection mould. Thus, the male core part is supported while subjected to the high injection forces during the injecting of the molten plastics material into the mould cavity, in particular into the sleeve body cavity. This support prevents core shifting during the injection moulding process and thus allows for a simpler core construction and better control over the wall thickness of the squeezable tube.

In an alternative embodiment of an injection mould according to the invention, the runner end part and the shoulder end part are combined in a single mould part comprising slidable elements to create a cavity additional to the runner cavity after the runner body is formed. In such an embodiment, a single male and female part are used.

Figure 7:
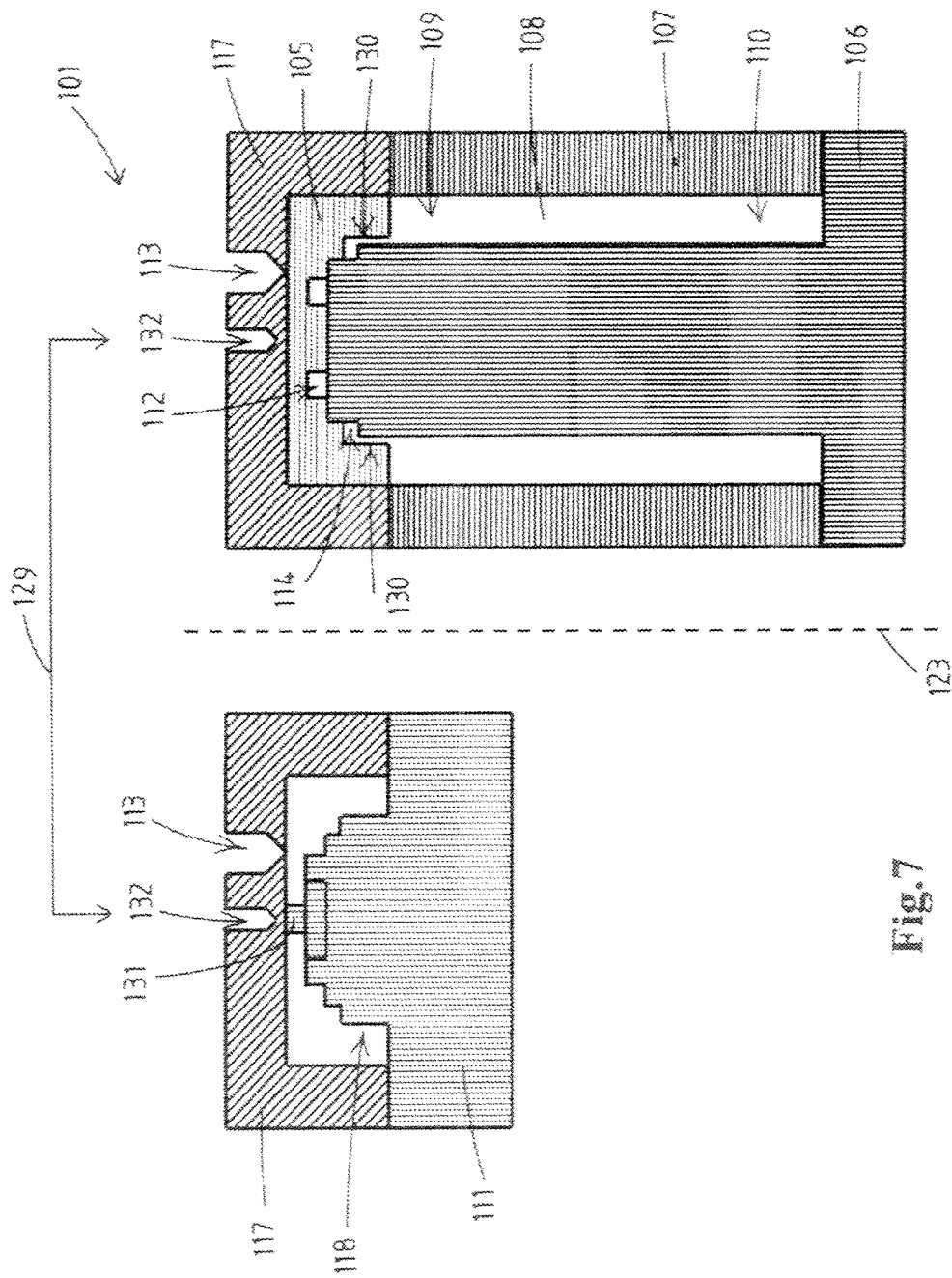
FIG. 7 shows a cross sectional view of a simplified two stage injection mould according to the invention for providing a squeezable tube body shown in FIGS. 3 and 4, comprising a flexible sleeve body, a runner body and a shoulder body.

FIG. 7 shows an alternative two stage injection moulding device 101 according to the invention, for injection moulding a shoulder body 105 in a first stage, and injection moulding a runner body and a flexible sleeve body in a second stage, such that the runner body and the flexible sleeve body are injection moulded integral with the shoulder body 105.

In this embodiment the injection moulding device comprises a shoulder base part 111, a shoulder end part 117, a male mould part 106 and a female mould part 107. In contrast with the two stage injection moulding device shown in FIG. 6, the runner cavity 112 is not formed by a runner end part in combination with the male and female part, but by the shoulder end part 117 comprising an injection moulded shoulder body 105 in combination with the male and female part.

In the first stage, performed on the left side of the injection mould 101 shown, the shoulder end part 117 in combination with the shoulder base part 111 forms a shoulder body cavity 118 for forming the shoulder body 105 between them. The shoulder end part 117 comprises an injection opening 113 for injecting a flow of molten plastics material into the shoulder body cavity 118. Furthermore, the injection mould comprises a pin 131 to form an opening in the shoulder body 105 with an opening adjacent a second injection opening 132 in the shoulder end part 117.

In the embodiment shown, the shoulder base part 111 and the male and female mould 106, 107 are fixed on opposite sides of an imaginary pivot axis 123. Two shoulder end parts 117 are provided which can be moved about the axis 123 to combined them with the shoulder base part 111 or the female and male mould part 107, 106.

The female mould part 107 in combination with the male mould part 106 forms a sleeve body cavity 108 for forming the flexible sleeve body between them. The sleeve body cavity extends from a top end 109 to an opposite bottom end 110 in a longitudinal direction. It is observed that the male and female part can be of similar design as with the previously described two stage injection mould.

In the second stage, the shoulder end part 117 comprising the injection moulded shoulder body 105 is combined with the female mould part 107 and the male mould part 106 to form a runner cavity 112 at the top end of the sleeve body cavity 108. This runner cavity comprises the opening of the shoulder body for injecting a flow of molten plastics material from the second injection opening 132 in the shoulder end part through said opening into the runner cavity 112 for injection moulding the runner body and the flexible sleeve body integral with the shoulder body. It is observed that in FIG. 7 the opening in the shoulder body lies beyond the plane of the picture, this, only part of the injection opening is shown. In the left part of the injection mould shown in FIG. 6, the pin 131 for providing this opening is shown because the shoulder cavity is shown without the shoulder body inside it.

The runner cavity 112 comprises, similar to the runner cavity in the alternative injection mould described above, an annular shaped distribution channel 114 located along the top end perimeter of the sleeve body cavity 108, one or more runner channels which extend between the opening in the shoulder body and the annular shaped distribution channel, and a passage 130. The passage 130 is constituted by one opening which extends along the entire perimeter of the top end of the cavity 108, and is thus evenly distributed along the perimeter of the sleeve body cavity. The opening 130 connects the annular shaped distribution channel 114 with the sleeve body cavity 108 for guiding the molten plastics material from the distribution channel into the sleeve body cavity.

The opening 130 is narrow compared to the distribution channel upstream 114 of the passage such that the passage initially prevents the flow of molten plastics material from entering the sleeve body cavity, which results in a pressure build up in the runner cavity. This pressure build up eventually results in a pressure high enough to force the flow of molten plastics material through the passage into the sleeve body cavity.

The two stage injection process with the injection mould shown in FIG. 7, first the shoulder body is formed in the shoulder body cavity by injecting a flow of molten plastics material into the shoulder body cavity and filling the shoulder body cavity to form a shoulder body.

When the shoulder body is sufficiently set, the combined shoulder body end part of the mould and the injection moulded shoulder body are moved to form a runner cavity adjacent the sleeve body cavity, to allow for injection moulding the runner body and the flexible sleeve body integral with the shoulder body. Thus, the runner body cavity is formed inbetween the injection moulded shoulder and the male and female part of the injection mould. It is observed that the runner channels can be formed in the male mould part or, at least partially, in the shoulder body. In the particular embodiment shown, the runner channels are formed in the shoulder body.

In the second stage, molten plastics material is injected into the runner cavity, and guided via the opening, to the runner channels and into the distribution channel. The distribution channel is connected to the sleeve body cavity via the passage, which is so narrow that it initially prevents the flow of molten plastics material from passing the passage and entering into the sleeve body cavity.

When the runner cavity is fully filled with the molten plastics material a pressure build up is created in the runner cavity until the pressure is high enough, preferably at least 200 bar, more preferably at least 300 bar, more preferably at least 350 bar, to force the molten plastics material through the passage and into the sleeve body cavity.

When the material in the sleeve body cavity is sufficiently set, the tube body is ejected form the injection mould.

Other embodiments of an injection mould for providing a flexible sleeve body and a runner body with a shoulder by way of three, or more, stage injection moulding can be designed by a skilled person based on the information disclosed in this document. Preferably, the mould is also designed for two component injection moulding using a first type of plastics material for injection moulding the flexible sleeve body and the shoulder body and a second type of plastics material for injection moulding the shoulder part. Thus, the shoulder part can be injection moulded in a different colour of with a different stiffness than the sleeve body and the runner body.

It is furthermore considered obvious to the skilled person that a mould according to the invention can be designed for providing multiple combined tube bodies in one session. In such an embodiment, a pre-runner distribution system is provided which divides the flow of molten plastics material over the multiple runner systems. The pre-runner distribution systems are removed from the runner systems when the tube bodies are ejected from the mould, or after the ejection.

The flexible sleeve body shown in the figures has a cylindrical shape with an essentially circular cross section. It should be understood that the cylindrical shapes having other types of cross sections, for example oval, square, rectangular or other shaped cross sections are also considered to fall within the scope of the invention.

In the embodiments shown, the runner cavity comprises runner channels which divert in a radial direction essentially perpendicular to the longitudinal axis of the tube body from the insert opening, and which have end sections which extend in the longitudinal direction prior to connecting to the annular shaped distribution channel. This configuration is in particular useful in combination with shoulder parts having a flat top surface as shown in FIG. 2. In an alternative embodiment, the shoulder body is for example conical shaped and the runner channels extend at an angle with the longitudinal axis of the tube body such that they are located adjacent the inside surface of the conical shaped shoulder body.

Figure 8:
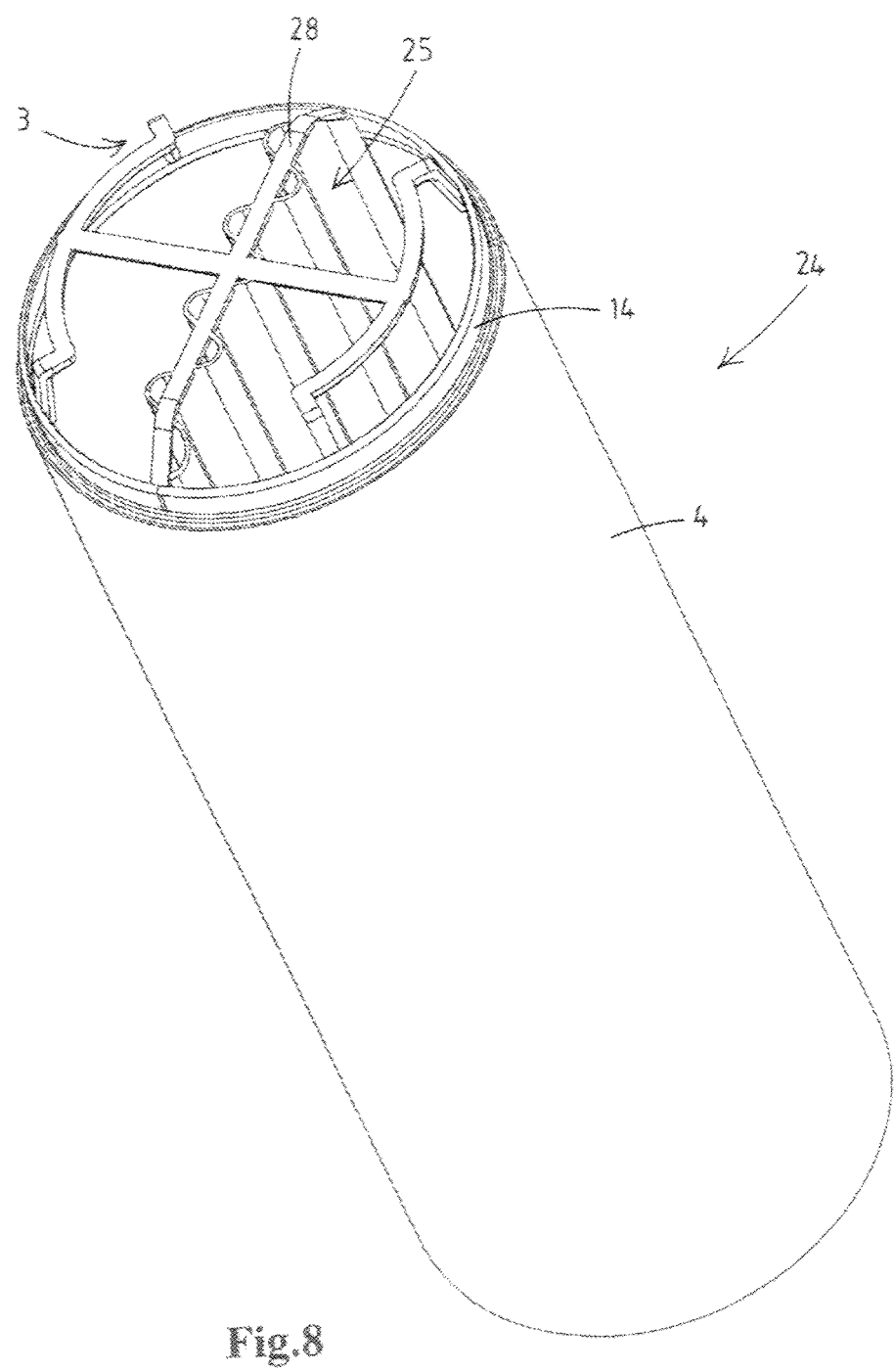
FIG. 8 shows a perspective view of a tube body according to the invention comprising a dividing wall which separates the space defined by the flexible sleeve body into two compartments.

FIG. 8 shows a perspective view of a tube body 24 comprising a longitudinal dividing wall 25 which separates the space defined by the flexible sleeve body 26 into two compartments.

For providing a squeezable tube body comprising a flexible sleeve body and at least one longitudinal dividing wall, dividing a space defined by the flexible sleeve body into two or more separate compartments extending in the longitudinal direction of the flexible tube body, an injection mould according to the invention is provided with a male mould part comprising two or more parts which between them form separating wall cavities for forming the one or more flexible separating walls within the flexible sleeve body.

The top end of such a dividing wall cavity is connected directly to the runner channels, such that the injection moulded dividing wall of the tube body product is connected to the runner channels at its top end. This allows for injection moulding the shoulder body at least adjacent the runner channels, but preferably comprising the runner channel, to provide a seal between the compartments at the top end of the tube.

FIG. 8 shows a flexible sleeve with a runner body comprising cross shaped runner channels with four essentially straight runner channels 28. Two of these channels intersect the corrugated dividing wall at several locations. In the mould, the channel for providing the runner channels is connected to the cavity for providing the dividing wall. The other two runner channels bifurcate into two branches similar to the runner bodies show in FIGS. 1-4. it is observed that the injection point is located at the cross section of the runner channels and the flow thus reaches the annular distribution channel via the first two runner channels first and via the second, bifurcated channels, second. It is observed that in a preferred embodiment according to the invention, the design of the runner channels, i.e. the shape and length, is adapted such that the flow reaches the distribution channel via all runner channels at the same moment. In an alternative example, the two runner channels for example do not bifurcate but run straight to the distribution channel such that the length and shape of all the runner channels is similar.

Figure 9:
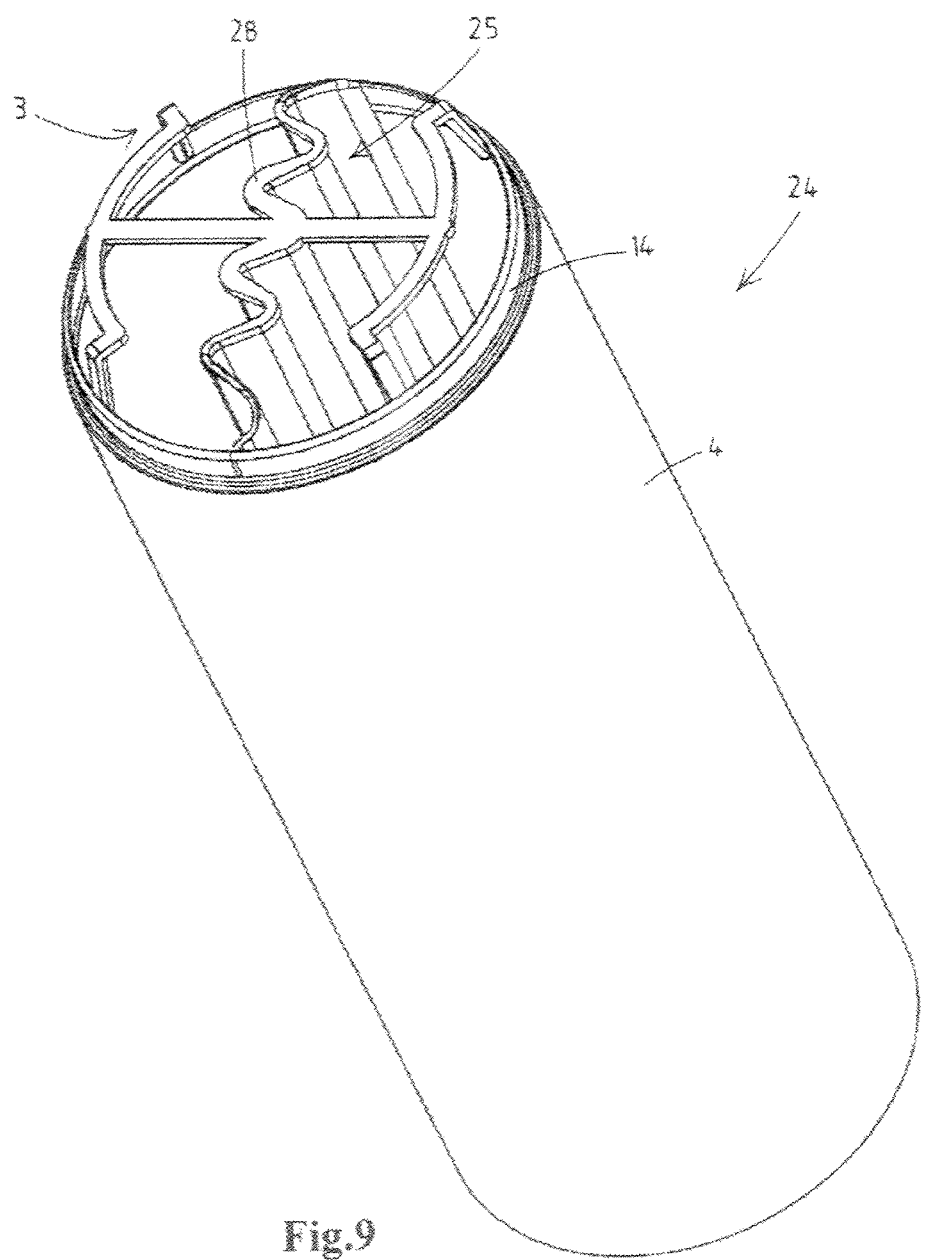
FIG. 9 shows an alternative embodiment of the tube body shown in FIG. 8.

FIG. 9 shows an alternative embodiment, wherein two runner channel 28 follow the corrugated shape of the dividing wall to obtain optimal connection between the runner body and the dividing wall. The shoulder body to be provided over the runner system will have an off centre dispensing opening.

The preferred dividing wall 25 shown has a corrugated shape, such that the width of the wall is equal to an inner half perimeter of the flexible tube body when fully expanded to eliminate the corrugations. Thus, the bottom portion of the flexible sleeve body can be flattened and sealed against the fully expanded partition forming wall to form a flattened sealed end of the squeezable tube.

The separating wall cavities are connected to the flexible sleeve body cavity via slit shaped openings extending along the length of the dividing wall. The openings are dimensioned such that the molten plastics material flows via the opening to the flexible sleeve body cavity after the dividing wall cavity is essentially filed. Thus, the dividing walls are connected to the flexible sleeve via a film shaped connection.

The male core part for providing the flexible tube body shown in FIG. 8 comprises a dividing wall cavity in the form of one longitudinal slit. Alternatively, the male mould part, when seen in the longitudinal direction, is divided in pie shaped parts for providing the flexible tube body with separating walls which divide the space defined by the flexible sleeve body in pie shaped separate compartments.

Furthermore, alternatively to the mould for providing the single wall shown in FIG. 8, the male core part can be divided, when seen in the longitudinal direction, in concentric essentially ring shaped parts for providing the flexible tube body with one or more flexible separating walls which divide the space defined by the flexible sleeve body in concentric shaped compartments.

In a further embodiment according to the invention, the shoulder is provided with an integral lid for closing the tube, which lid is formed in a lid cavity communicating with the shoulder body cavity. In such an embodiment, the molten plastic material can be injected into the shoulder cavity via the lid cavity into the shoulder cavity.

The present invention is particularly, although not exclusively, applicable to injection moulding devices for moulding flexible sleeve bodies having a wall thickness of 1 mm or less, preferably 0.6 mm or less. The flexible sleeve and the runner body are injection moulded from a molten plastics material, such as a polymeric material, for example an elastomeric material, for example a combination of a PP and an elastomeric material, or TPE with a MFI index of at least 100 and en E-modulus of less than 500, or a similar material.

The shoulder body is injection moulded from a molten plastics material, which may be the same as the material of which the flexible sleeve body is made. Preferably, the shoulder body is made of a material less flexible than the material the flexible sleeve body is made of.

It is observed that the injection moulding device depicted in FIGS. 6 and 7 are highly simplified depictions, which, in combination with the other Figs. are used to explain the principle of the invention. The Figs. are not drawn on scale and do not depict actual dimensions and/or proportions. Furthermore, the injection moulds shown in FIGS. 6 and 7 are in practice incorporate in injection moulding devices comprising for example cooling devices, plastic material injection devices, robotic demoulding devices, etc. known in the prior art.

The invention claimed is:

1. Injection moulding device (1) for two stage injection moulding a flexible sleeve body and a shoulder body for a squeezable tube by injection moulding a runner body and the flexible sleeve body in a first stage, and injection moulding the shoulder body adjacent the runner body and the flexible sleeve body in a second stage, such that the shoulder body is injection moulded integral with the runner body and the flexible sleeve body, the injection moulding device comprising:
   a male mould part (6);
   a female mould part (7) which in combination with the male mould part (6) forms a sleeve body cavity (8) for forming the flexible sleeve body (4) between them, which sleeve body cavity (8) extends from a top end (9) to an opposite bottom end (10) in a longitudinal direction,
   a runner end part (11), which in combination with the female mould part (7) and the male mould part (6) forms a runner cavity (12) at the top end (9) of the sleeve body cavity (8), which runner cavity comprises:
   an injection opening (13) for injecting a flow of molten plastics material into the runner cavity (12);
   an annular shaped distribution channel (14) located along the top end perimeter of the sleeve body cavity (8);
   one or more runner channels (15) which extend between the injection opening (13) and the annular shaped distribution channel (14);
   a passage (30) constituted by one or more openings connecting the annular shaped distribution channel (14) with the sleeve body cavity (8) for guiding the molten plastics material from the distribution channel into the sleeve body cavity, which one or more openings is/are evenly distributed along the perimeter of the sleeve body cavity (8) and is/are narrow compared to the distribution channel (14) upstream of the passage such that the passage initially prevents the flow of molten plastics material from entering the sleeve body cavity, which results in a pressure build up in the runner cavity (12) which eventually results in a pressure high enough to force the flow of molten plastics material through the passage into the sleeve body cavity (8);
   a shoulder end part (17), which in combination with the female mould part (7) and the male mould part (6) forms the shoulder body cavity (18) for forming the shoulder body (5), which shoulder end part (17) comprises an injection opening for injecting a flow of molten plastics material into the shoulder body cavity (18), for injection moulding the shoulder body in the shoulder body cavity adjacent the runner body and the flexible sleeve body, such that the shoulder body is injection moulded integral with the runner body and the flexible sleeve body.

2. Injection moulding device (101) for two stage injection moulding a flexible sleeve body and a shoulder body for a squeezable tube by injection moulding the shoulder body in a first stage, and injection moulding a runner body and a flexible sleeve body in a second stage such that the runner body and the flexible sleeve body are injection moulded integral with the shoulder body, the injection moulding device (101) comprising:
   a shoulder base part (111);
   a shoulder end part (117) which in combination with the shoulder base part (111) forms a shoulder body cavity (118) for forming the shoulder body between them, which shoulder end part (111) comprises an injection opening (113) for injecting a flow of molten plastics material into the shoulder body cavity (118), and wherein the injection mould comprises a pin (131) to provide the shoulder body with an opening adjacent a second injection opening (132) in the shoulder end part;
   a male mould part (106);
   a female mould part (107) which in combination with the male mould part (106) forms a sleeve body cavity (108) for forming the flexible sleeve body between them, which sleeve body cavity (108) extends from a top end (109) to an opposite bottom end (110) in a longitudinal direction, and
   wherein the shoulder end part (117) including an injection moulded shoulder body, in combination with the female mould part (107) and the male mould part (106) forms a runner cavity (112) at the top end (109) of the sleeve body cavity (108), which runner cavity comprises:
   the opening of the shoulder body for injecting a flow of molten plastics material from the second injection opening (132) in the shoulder end part (117) via said opening into the runner cavity (112) for injection moulding the runner body and the flexible sleeve body integral with the shoulder body;

an annular shaped distribution channel (114) located along the top end perimeter of the sleeve body cavity (108);

one or more runner channels (115) which extend between the opening in the shoulder body and the annular shaped distribution channel (114);

a passage (130) constituted by one or more openings connecting the annular shaped distribution channel (114) with the sleeve body cavity (108) for guiding the molten plastics material from the annular shaped distribution channel into the sleeve body cavity, which one or more openings is/are evenly distributed along the perimeter of the sleeve body cavity (108) and is/are narrow compared to the annular shaped distribution channel (114) upstream of the passage (130) such that the passage initially prevents the flow of molten plastics material from entering the sleeve body cavity (108), which results in a pressure build up in the runner cavity (108) which eventually results in a pressure high enough to force the flow of molten plastics material through the passage (130) into the sleeve body cavity (108).

3. Injection moulding device according to claim 1 or 2, wherein the passage is dimensioned such that the flow of molten plastics material only enters the sleeve body cavity after the runner cavity is fully filled and the pressure in the distributing channel is at least 200 bar, preferably at least 300 bar, more preferably at least 350 bar.

4. Injection moulding device according to claim 1 or 2, wherein the passage is constituted by a single ring shaped slit provided between the annular shaped distribution channel (14) and the sleeve body cavity (8), which slit extends along the perimeter of the sleeve body cavity.

5. Injection moulding device according to claim 1 or 2, wherein the one or more openings has/have a width or diameter of about 0,3 mm, preferably less than 0,3 mm.

6. Injection moulding device according to claim 1 or 2, wherein the passage is narrow compared to the sleeve body cavity directly downstream of the passage such that the flow of molten plastics material, when pressed through the passage, can freely flow into the wider part of the sleeve body cavity.

7. Injection moulding device according to claim 1 or 2, wherein the openings are each part of a channel, which channels are preferably located within the perimeter of the sleeve body cavity.

8. Injection moulding device according to claim 1 or 2, wherein the runner cavity, more in particular the distribution channel of the runner cavity, is located within the perimeter of the sleeve body cavity.

9. Injection moulding device according to claim 1 or 2, wherein the distribution channel has a tapered cross section, such that it narrows towards the sleeve body cavity.

10. Injection moulding device according to claim 1 or 2, wherein the cross section of the distribution channel is substantially smaller then the cross section of each runner channel.

11. Injection moulding device according to claim 1 or 2, wherein the one or more runner channels bifurcate into multiple branches which open out into the annular distribution channel at regular intervals along the perimeter of the annular distribution channel to evenly distribute the flow of molten plastics material over the distribution channel.

12. Injection moulding device according to claim 1 or 2, wherein the length and the cross section of the runner channels are dimensioned such that the flow of molten plastics material enters the distribution channel via each channel at essentially the same moment.

13. Injection moulding device according to claim 1 or 2, wherein the mould is equipped for in mould labelling, to provide the sleeve body with a label, preferably with a label having specific barrier properties to provide the sleeve body with better barrier properties against for example gases or water vapour than the basic material of the tube.

14. Injection moulding device according to claim 1 or 2, wherein the mould is equipped for sandwich injection moulding the shoulder body, for providing a sleeve body with an integral shoulder having better barrier properties against for example gases or water vapour than the basic material of the shoulder body.

15. Method for providing a squeezable tube body comprising a runner body, a flexible sleeve body, and a shoulder body, using an injection moulding device according to claim 1, the method comprising:

providing the runner cavity adjacent the sleeve body cavity;

injecting molten plastics material into the runner cavity;

providing a passage between the runner cavity and the sleeve body cavity which passage is so narrow that it initially prevents the flow of molten plastics material from passing the passage and entering into the sleeve body cavity;

fully filling the runner cavity with the molten plastics material and subsequently providing a pressure build up in the runner cavity until the pressure is high enough, preferably at least 200 bar, more preferably at least 300 bar, more preferably at least 350 bar, to force the molten plastics material through the passage and into the sleeve body cavity;

providing a shoulder body cavity comprising part of the runner body and the flexible sleeve body formed in the previous steps;

injecting a flow of molten plastics material into the shoulder body cavity and filling the shoulder body cavity to form a shoulder body onto and integral with the runner body and the sleeve body.

16. Method for providing a squeezable tube body comprising a runner body, a flexible sleeve body, and a shoulder body, using an injection moulding device according to claim 2, the method comprising the steps:

providing a shoulder body cavity;

injecting a flow of molten plastics material into the shoulder body cavity and filling the shoulder body cavity to form a shoulder body;

providing the shoulder body adjacent the sleeve body cavity to form the runner cavity adjacent the sleeve body cavity to allow for injection moulding the runner body and the flexible sleeve body integral with the shoulder body;

injecting molten plastics material into the runner cavity;

providing a passage between the runner cavity and the sleeve body cavity which passage is so narrow that it initially prevents the flow of molten plastics material from passing the passage and entering into the sleeve body cavity;

fully filling the runner cavity with the molten plastics material and subsequently providing a pressure build up in the runner cavity until the pressure is high enough, preferably at least 200 bar, more preferably at least 300 bar, more preferably at least 350 bar, to force the molten plastics material through the passage and into the sleeve body cavity.

17. Squeezable tube body (2) comprising a flexible sleeve body (4) obtained by using an injection moulding device according claim 1 or 2.

18. Squeezable tube body (2) comprising a runner body (3), a flexible sleeve body (4) and a shoulder body (5), obtained by a method according to claim 15 or 16.

* * * * *